United States Patent
Imamura et al.

(10) Patent No.: US 8,088,444 B2
(45) Date of Patent: Jan. 3, 2012

(54) METHOD AND APPARATUS FOR APPLYING ELECTRODE MIXTURE PASTE

(75) Inventors: Kimihiro Imamura, Kanagawa (JP);
Hiroyuki Usui, Kanagawa (JP);
Tadakazu Seto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 900 days.

(21) Appl. No.: 11/919,236

(22) PCT Filed: Apr. 11, 2006

(86) PCT No.: PCT/JP2006/307616
§ 371 (c)(1),
(2), (4) Date: Apr. 29, 2008

(87) PCT Pub. No.: WO2006/115034
PCT Pub. Date: Nov. 2, 2006

(65) Prior Publication Data
US 2009/0007843 A1    Jan. 8, 2009

(30) Foreign Application Priority Data
Apr. 25, 2005  (JP) ................................ 2005-126289

(51) Int. Cl.
*H01M 4/10* (2006.01)
*H01M 4/26* (2006.01)
*H01M 4/02* (2006.01)
*H01M 4/04* (2006.01)
*H01M 4/64* (2006.01)
*B05C 17/025* (2006.01)

(52) U.S. Cl. ........... 427/356; 141/1.1; 141/33; 141/125; 29/2; 29/623.1; 429/223; 118/111; 427/58

(58) Field of Classification Search .................... 141/1.1, 141/33, 125
See application file for complete search history.

(56) References Cited

U.S. PATENT DOCUMENTS
1,825,854 A * 10/1931 Coryell .................... 228/160
(Continued)

FOREIGN PATENT DOCUMENTS
JP        56-86460        7/1981
(Continued)

OTHER PUBLICATIONS

Machine Translation of Japanese Patent JP 09134722 A, 14 pages, Pub Date: May 20, 1997.*
(Continued)

*Primary Examiner* — Michael Cleveland
*Assistant Examiner* — Francisco Tschen
(74) *Attorney, Agent, or Firm* — McDermott Will & Emery LLP

(57) ABSTRACT

An electrode mixture paste (5) is applied on both sides of a strip of core material (1) made of porous metal sheet that is running along its lengthwise direction. The paste-coated core material (1) is pressed with press rollers (15a, 15b) alternately from opposite sides once or more, after which the paste-coated core material (1) is passed through the gap between a pair of scraper tools (16a, 16b) to adjust the coating thickness of the paste (5), while the position of the core material (1) is restricted with comb-shaped projections (17a or 17a, 17b), so that, even though the projections (17a, 17b) are distanced from each other sufficiently to allow weld points of the core material (1) to pass through, the coating thickness is precisely regulated. Therefore, a method of applying an electrode mixture paste is realized, with which coating thickness is precisely adjusted and, even in a continuous production process in which core materials are connected together by welding, production failures due to weld points being stuck are prevented.

3 Claims, 5 Drawing Sheets

U.S. PATENT DOCUMENTS

| | | | |
|---|---|---|---|
| 4,887,349 A * | 12/1989 | Kambayashi et al. | 29/623.5 |
| 2001/0028978 A1 | 10/2001 | Inoue et al. | |
| 2005/0045602 A1 * | 3/2005 | Holte et al. | 219/121.64 |

FOREIGN PATENT DOCUMENTS

| | | |
|---|---|---|
| JP | 03-203161 | 9/1991 |
| JP | 4-332467 | 11/1992 |
| JP | 7-85869 | 3/1995 |
| JP | 08-190906 | 7/1996 |
| JP | 9-134722 | 5/1997 |
| JP | 11-058047 | 3/1999 |
| JP | 11-242956 | 9/1999 |
| JP | 2001-297747 | 10/2001 |
| JP | 2002-160065 | 6/2002 |

OTHER PUBLICATIONS

Supplementary European Search Report, issued in European Patent Application No. EP 06 73 1563, mailed on Dec. 16, 2010.

* cited by examiner

METHOD AND APPARATUS FOR APPLYING ELECTRODE MIXTURE PASTE

RELATED APPLICATIONS

This application is the U.S. National Phase under 35 U.S.C. §371 of International Application No. PCT/JP2006/307616, filed on Apr. 11, 2006, which in turn claims the benefit of Japanese Application No. 2005-126289, filed on Apr. 25, 2005, the disclosures of which Applications are incorporated by reference herein.

TECHNICAL FIELD

The present invention relates to a method and an apparatus for applying electrode mixture paste, and in particular, to a method and an apparatus for applying electrode mixture paste with which a core material made of porous metal sheet can be precisely coated with paste on both sides to a required thickness and with which production failures can be prevented.

BACKGROUND ART

Alkaline rechargeable batteries and lithium ion rechargeable batteries are widely used as the power source of portable devices, electric tools, or electric vehicles. Nickel metal hydride rechargeable batteries, among others, have a relatively high energy density and excellent durability, and have found increasing applications particularly in electric vehicle power source systems.

The main compositions of nickel metal hydride rechargeable battery are, generally, a positive electrode formed of a three-dimensional porous metal body filled with nickel hydroxide and other components, and a negative electrode formed of a core material which is a porous metal sheet such as punched metal and electrode mixture paste composed of hydrogen-absorption alloy and other components applied on the core material. Of these two, the negative electrode is attracting attention because of its potential for continuous production and possibilities of highly efficient manufacture. More specifically, a known technique for adjusting the coating thickness of electrode mixture paste is, after immersing the core material in electrode mixture paste to apply the paste on both sides of the core material, to pass the paste-coated core material through a gap between a pair of scraper tools, the surface of the core material making contact with several projections provided to the scraper tools to restrict the position of the core material so that it passes through the center between the tools. (see, for example, Patent Document 1).
[Patent Document 1] Japanese Patent Laid-Open Publication No. 9-134722

DISCLOSURE OF THE INVENTION

Problems to be Solved by the Invention

When using the above batteries as the power source of electric vehicles, one car requires 100 to 200 cells connected in series to achieve high voltage output. Manufacture of a large amount of such electrodes is designed to include a fewer number of times for adjusting the coating thickness of electrode mixture paste, for example by welding together several hundred meter long core materials during production to enable continuous processing of the core materials over a length of several kilometers.

However, with the application method disclosed in Patent Document 1, the size of the gap between the pair of scraper tools determines the coating thickness to which it is adjusted, and the position of the core material is restricted by the projections provided to the scraper tools making contact with the surface of the core material. The problem is that when a weld point that has a doubled thickness passes between the scraper tools, the weld point gets stuck between the projections of the scraper tools, because of which the application process has to be stopped.

If, to solve this problem, the distance between the projections of the pair of scraper tools were increased to equal to or more than twice larger than the thickness of the core material, the running core material would be displaced, making it impossible to adjust the coat on both sides to a uniform thickness. In an electric vehicle battery, as mentioned above, 100 to 200 cells are connected in series, and lowered coating thickness precision would cause capacity variation among cells, which may lead to failures such as generation of gas or heat in low-capacity cells.

In light of the problems in the conventional techniques mentioned above, an object of the present invention is to provide a method and an apparatus for applying electrode mixture paste with which coating thickness is precisely adjusted and, even in a continuous production process in which core materials are connected together by welding, production failures due to weld points being stuck are prevented.

Means for Solving the Problems

To achieve the above object, a method for applying an electrode mixture paste according to the present invention includes: an application step of applying an electrode mixture paste on both sides of a strip of core material made of porous metal sheet as the core material runs along a lengthwise direction thereof; a uniformizing step of pressing the core material coated with the electrode mixture paste alternately from opposite sides once or more; and a coating thickness adjusting step of adjusting a coating thickness of the electrode mixture paste by passing the core material coated with the electrode mixture paste through a gap between a pair of scraper tools, a position of the core material being restricted using comb-shaped projections provided to at least one of the scraper tools.

With this method, as the core material coated with the electrode mixture paste is pressed alternately from opposite sides, the applied paste is repeatedly pushed out through the pores in the core material, whereby air bubbles in the applied paste are removed and paste properties are made uniform. This enables precise position restriction of the core material with the comb-shaped projections equally working on both sides, even though the comb-shaped projections of the following scraper tools are distanced from each other by a length equal to or more than twice larger than the thickness of the core material so that the weld points of the core material passes smoothly through the gap between the scraper tools. As a result, the coating thickness is precisely adjusted and, even in a continuous production process in which core materials are connected together by welding, production failures due to weld points being stuck are prevented.

The comb-shaped projection that is provided to one scraper tool is made contact with one surface of the core material to restrict the position of the core material so as to achieve precise position control of the core material. The increased running stability ensures precise regulation of the coating thickness.

A press member that is nearest to the pair of scraper tools may be offset from a centerline of the gap between the scraper tools along a running direction of the core material towards a side of one scraper tool that is provided with the comb-shaped projections, so as to ensure that the core material runs in contact with the comb-shaped projections of one scraper tool, whereby the coating thickness is adjusted stably and precisely.

The present invention also provides an apparatus for applying an electrode mixture paste including: an uncoiler unit for unwinding a core material from a coil thereof; a coating unit where the core material is immersed in an electrode mixture paste to coat the core material with the paste on both sides thereof; a coating thickness adjusting unit for adjusting a coating thickness of the electrode mixture paste; a drying unit for drying the electrode mixture paste; and a coiler unit for taking up the core material into a coil on which the electrode mixture paste has been applied and dried, wherein the coating thickness adjusting unit includes at least one pair of press members for pressing the core material coated with the electrode mixture paste alternately from opposite sides, and a pair of scraper tools, at least one of which includes a comb-shaped projection for restricting a position of the core material, the core material coated with the electrode mixture paste being passed through a gap between the scraper tools.

With this structure, by setting coils of core material in the uncoiler unit and starting the application apparatus, the coiler unit produces coils of finished core material on which the electrode mixture paste has been applied and dried, as the electrode mixture paste is applied on both sides of the core material to a precisely controlled thickness, and even in a continuous production process in which core materials are connected together by welding, production failures due to weld points being stuck are prevented, by the above application method.

The comb-shaped projection which is made contact with one surface of the core material to restrict the position of the core material may be provided to one scraper tool, and the press member that is nearest to the scraper tools may be offset from a centerline of the gap between the scraper tools along a running direction of the core material towards the side of one scraper tool that is provided with the comb-shaped projection, so as to ensure that the core material runs in contact with the comb-shaped projections of one scraper tool, whereby the coating thickness is adjusted stably and precisely.

A welding unit for connecting core materials together may be set between the uncoiler unit and the coating unit so that the core materials are welded together during the operation of the application apparatus for continuous production, whereby the number of times for adjusting the coating thickness is reduced and the production efficiency improved.

BEST MODE FOR CARRYING OUT THE INVENTION

One embodiment of the method and apparatus for applying electrode mixture paste of the present invention will be hereinafter described with reference to FIG. 1 to FIG. 5.

First Embodiment

A description will now be given of a first embodiment of the present invention with reference to FIG. 1 to FIG. 3.

Figure 1:
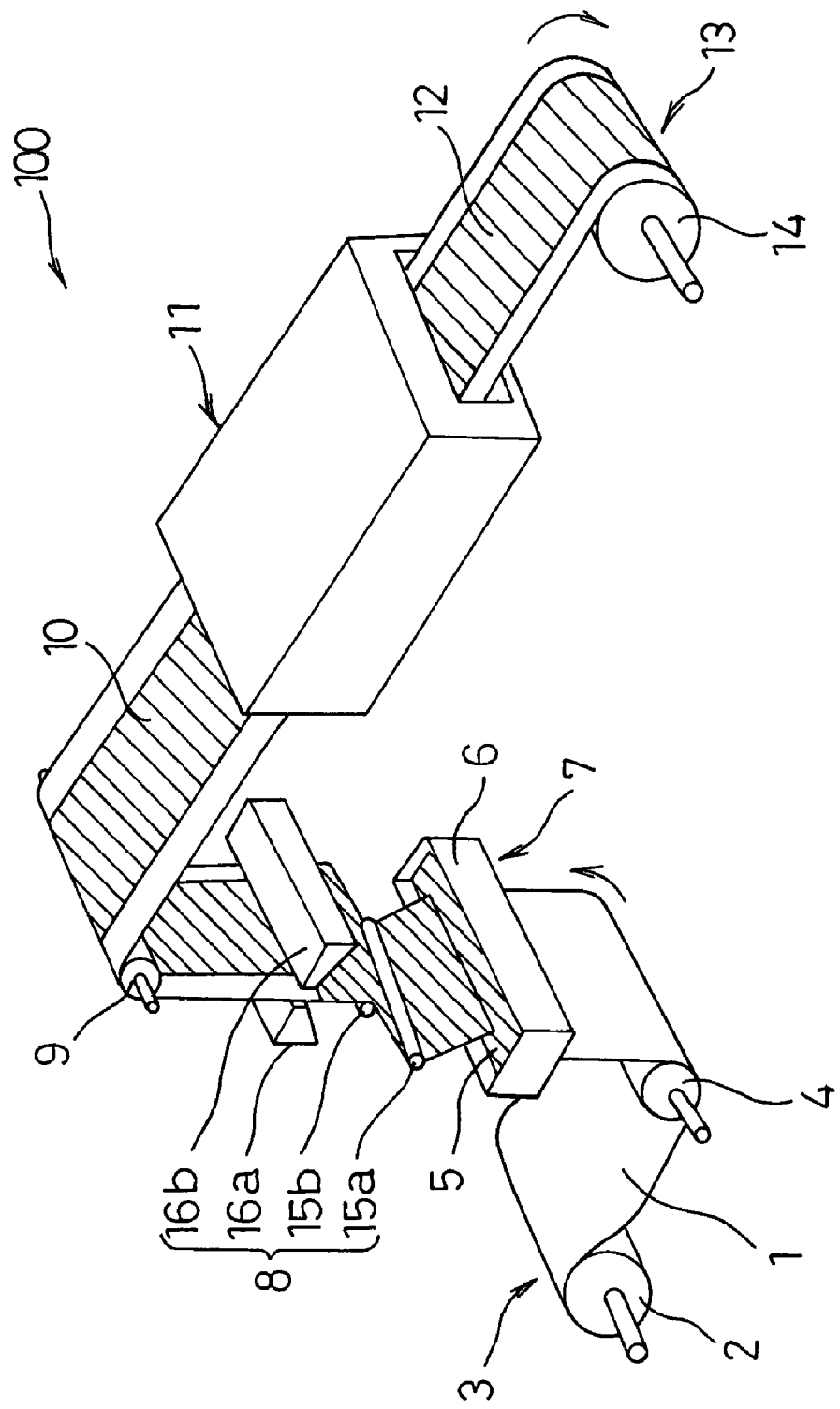
FIG. 1 is a schematic perspective view illustrating the structure of a first embodiment of an apparatus for applying electrode mixture paste in accordance with the present invention.

FIG. 1 is a perspective view illustrating the schematic overall structure of an application apparatus 100 according to the present embodiment. The application apparatus 100 includes an uncoiler unit 3 which holds a coil of core material 2 prepared by winding a strip of a core material 1 made of porous metal sheet and unwinds the strip of core material 1. The core material 1 is drawn out horizontally from the uncoiler unit 3, turned about 90° around a guide roller 4 to be directed upwards and to run into a coating unit 7. The coating unit 7 includes a paste bath 6 filled with an electrode mixture paste 5, with the core material 1 being arranged to run through the paste bath 6, so that the core material 1 is coated with the electrode mixture paste 5 on both sides in this coating unit 7.

The core material 1 coated with the electrode mixture paste 5 runs approximately upwards and passes through a coating thickness adjusting unit 8 where the coating thickness of the paste 5 is adjusted, and comes out as a paste-coated sheet 10. The paste-coated sheet 10 turns about 90° around a guide roller 9 to be directed to the horizontal direction, runs into a drying unit 11 where the electrode mixture paste 5 is dried, and comes out as an electrode sheet 12, which is taken up in a coiler unit 13 to produce a coil of electrode 14.

Welding means (not shown) is arranged between the uncoiler unit 3 and the coating unit 7 so that, when the coil 2 of core material 1 runs out and another coil 2 of core material 1 is placed in the uncoiler unit 3, the ends of the core materials 1 are welded together to enable continuous production. Seam welding, which uses copper electrodes, is preferably used as the welding means.

Figure 2:
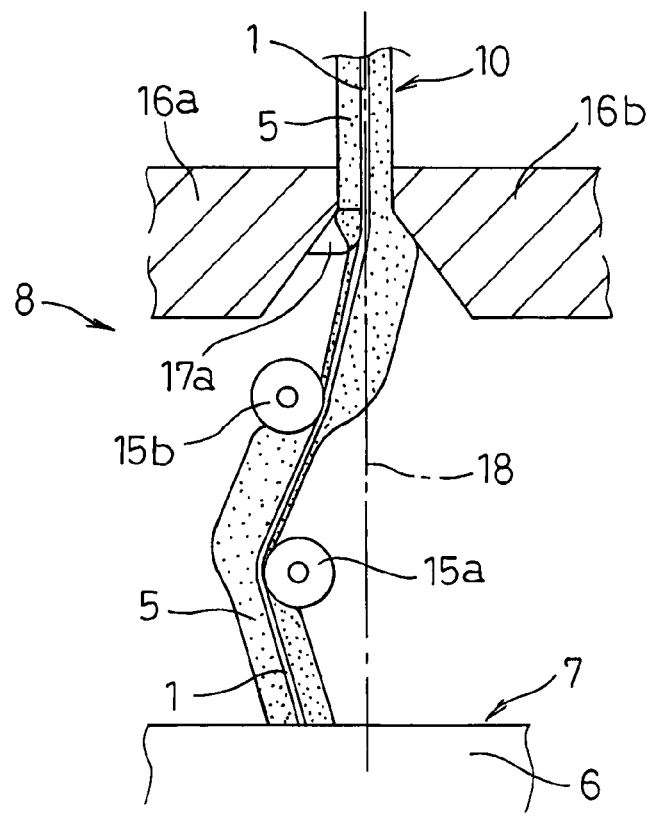
FIG. 2 is a side view illustrating the structure of the coating thickness adjusting unit in the same embodiment.
Figure 3:
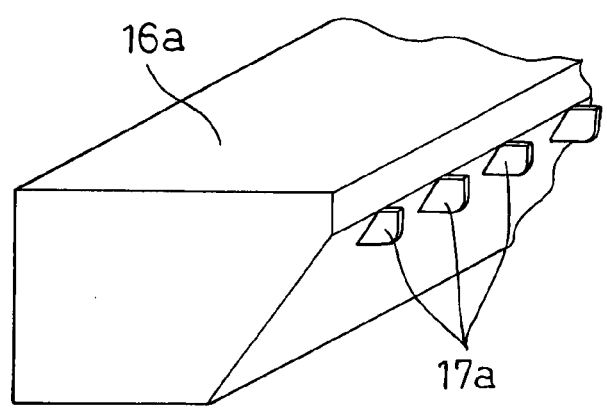
FIG. 3 is a partial perspective view of one of the scraper tools in the same embodiment.

As shown in FIG. 2 in detail, the coating thickness adjusting unit 8 is composed of one or a plurality of pairs of press rollers 15a and 15b that alternately press one surface each of the core material 1 coated with the electrode mixture paste 5 from opposite sides, and a pair of scraper tools 16a and 16b for adjusting the coating thickness of the paste 5 as the paste-coated core material 1 passes through the gap between them. Of the pair of scraper tools 16a and 16b, one scraper tool 16a is formed with a plurality of thin-plate projections 17a in a comb arrangement as shown in FIG. 3 to restrict the position of the core material 1 by making contact with the surface of the running core material 1. The other scraper tool 16b may also have comb-shaped projections, in which case the tips of the projections should be distanced from each other by a length that is equal to or more than twice larger than the thickness of the core material 1.

In the present embodiment, the press roller 15b nearest to the scraper tools 16a and 16b is offset from the centerline 18 of the gap between the scraper tools 16a and 16b along the running direction of the core material towards the side of the scraper tool 16a that has the projections 17a. The scraper tool 16a that has the projections 17a is arranged movable, while the other scraper tool 16b is fixedly set, so that the distance between the scraper tools 16a and 16b is adjustable by changing the position of the scraper tool 16a to regulate the coating thickness. Of course, both of the scraper tools 16a and 16b may be arranged movable for the position adjustment.

How this coating thickness adjusting unit 8 works will be described next with reference to FIG. 2. The core material 1 coated with the electrode mixture paste 5 is first pressed from one side by the press roller 15a to push the paste 5 through the pores in the core material 1 to the opposite side of the press roller 15a. The core material 1 is then pressed from the opposite side by the press roller 15b to push the paste 5 through the pores in the core material 1 to the opposite side of the press roller 15b. This process of pushing the paste 5 through the pores in the core material 1 alternately from opposite sides is performed at least once or repeated twice or more so as to remove air bubbles in the applied paste and to make the paste properties uniform.

Successively, the core material 1 coated with the electrode mixture paste 5 passes through the gap between the pair of scraper tools 16a and 16b. Since the press roller 15b nearest to the scraper tools 16a and 16b is offset from the centerline 18 of the gap towards the scraper tool 16a that has the projections 17a, it is ensured that the core material 1 runs in contact with the projections 17a, and it runs stably with its position being restricted.

The core material 1 coated with the electrode mixture paste 5 in this state enters the gap between the pair of scraper tools 16a and 16b, whereby the paste 5 that has been pushed out by the press roller 15b is pressed by the other scraper tool 16b and pushed out through the pores in the position-restricted core material 1 to the side of the scraper tool 16a. After that, finally, the pair of scraper tools 16a and 16b scrape off redundant electrode mixture paste 5. Thus, the core material 1 which is precisely positioned is coated with the electrode mixture paste 5 on both sides to a required thickness with uniform paste properties, whereby a paste-coated sheet 10 with the coating of precisely controlled thickness is produced.

The projections 17a provided to one scraper tool 16a are distanced from the end of the other scraper tool 16b by a length that is more than twice larger than the thickness of the core material 1 so that, even if the weld point where the ends of the core materials are welded together has a thickness twice larger than the thickness of the core material 1, the weld point will not be stuck in between the scraper tools 16a and 16b but pass through smoothly, and will not cause production failures.

Second Embodiment

Next, a second embodiment of the present invention will be described with reference to FIG. 4. The same elements as those of the first embodiment are given the same reference numerals and will not be described again, and the difference only will be described.

In the first embodiment described above, the press roller 15b nearest to the scraper tools 16a and 16b is offset from the centerline 18 of the gap between the scraper tools 16a and 16b to the side of one scraper tool 16a. In the present embodiment, the press roller 15b is positioned substantially on the centerline 18.

With the present embodiment, too, the core material 1 and the electrode mixture paste 5 that has been pushed out by the press roller 15b are pressed against the scraper tool 16a by the other scraper tool 16b, whereby the core material 1 makes contact with the projections 17a and its position is restricted. Thus, the core material 1 which is precisely positioned is coated with the electrode mixture paste 5 on both sides to a required thickness with uniform paste properties, whereby a paste-coated sheet 10 with the coating of precisely controlled thickness is produced. Also, even if the weld point where the ends of the core materials 1 are welded together has a thickness twice larger than the thickness of the core material 1, the weld point will not be stuck in between the scraper tools 16a and 16b but pass through smoothly, and will not cause production failures. Stability is better in the first embodiment because the core material 1 is more reliably brought into contact with the projections 17a.

Third Embodiment

Next, a third embodiment of the present invention will be described with reference to FIG. 5. The same elements as those of the first and second embodiments are given the same reference numerals and will not be described again, and the difference only will be described.

In the present embodiment, a plurality of press rollers 15c and 15d are provided for adjusting coating thickness between the press roller 15b of the second embodiment described above and the scraper tools 16a and 16b, so that the electrode mixture paste 5 is applied on both sides of the core material 1 with a substantially uniform thickness. The pair of scraper tools 16a and 16b each have a plurality of projections 17a and 17b in a comb arrangement for restricting the position of the core material 1. The projections 17a and 17b are adjusted so that their tips are distanced from each other by a length that is equal to or more than twice larger than the thickness of the core material 1.

With the present embodiment, the process of pushing out the electrode mixture paste 5 through the pores in the core material 1 alternately by the press rollers 15a and 15b is performed at least once or repeated twice or more so as to remove air bubbles in the applied paste and to make the paste properties uniform, after which the press rollers 15c and 15d make the coating thickness of the paste 5 substantially uniform on both sides of the core material 1. The core material 1 in this state enters the gap between the scraper tools 16a and 16b, whereby, while the projections 17a and 17b restrict the position of the core material 1 indirectly through the uniform paste interposed in the small gap between the tips of the projections 17a and 17b and the core material 1, the pair of scraper tools 16a and 16b scrape off redundant electrode mixture paste 5 from both sides of the core material 1. Thus, the core material 1 which is precisely positioned is coated with the electrode mixture paste 5 on both sides to a required thickness with uniform paste properties, whereby a paste-coated sheet 10 with the coating of precisely controlled thickness is produced.

The projections 17a and 17b provided to the scraper tools 16a and 16b are distanced from each other by a length that is equal to or more than twice larger than the thickness of the core material 1, so that, even if the weld point where the ends of the core materials 1 are welded together has a thickness twice larger than the thickness of the core material 1, the weld point will not be stuck in between the projections 17a and 17b but pass through smoothly, and will not cause production failures.

As is clear from the description of the embodiment above, the present invention can be applicable to any core material of porous metal sheet and is not limited to production of negative electrodes. For example, the invention is applicable to production of sintered substrates which are a precursor of sintered nickel positive electrode of an alkaline rechargeable battery, or positive or negative electrodes of lithium polymer batteries that use metal lath, which is a porous metal sheet.

The following is a description of working examples in which the present invention is applied to the negative electrode (hydrogen-absorption alloy electrode) of nickel metal hydride rechargeable battery, and comparative examples.

Example 1

Hydrogen-absorption alloy expressed by the composition formula $MmNi_{3.55}Co_{0.75}Mn_{0.4}Al_{0.3}$ was pulverized in water by wet ball mill to achieve hydrogen-absorption alloy powder with a mean particle diameter of 30 μm. The hydrogen-absorption alloy powder was immersed in an alkaline aqueous solution for surface treatment, after which 10 kg of aqueous carboxymethyl cellulose solution with a solid component ratio of 1.5% and 0.4 kg of Ketjen black were added to 100 kg of the hydrogen-absorption alloy powder and kneaded, and then 1.75 kg of styrene-butadiene copolymer rubber particles in aqueous solution with a solid component ratio of 40% was added and stirred, to produce electrode mixture paste.

The electrode mixture paste was applied on both sides of a core material 1 made of nickel-plated punched iron sheet with a thickness of 60 μm, a width of 300 mm, a punched hole diameter of 1 mm, and a pore rate of 40%, at a speed of 5 m/min (total length of the coil 2 of core material: 200 m), such that the coating width will be 260 mm and the total coating thickness will be 260 μm, while scraping off the paste 5 from 20 mm wide margins at both side edges. More specifically, the core material 1 and other units were arranged as shown in FIG. 2, the protruding length of the projections 17a being 100 μm, and the distance between the projections 17a and the scraper tool 16b being 160 μm. Paste was applied over a length of 1000 m, and the core materials were welded together four times during the process. The core material 1 did not once get stuck in between the scraper tools 16a and 16b during the paste application.

Samples were collected from the paste-coated sheet 10 by punching a portion at every 1 m using a 40 mm diameter puncher. The average differences in coating thickness between the front and back sides of these samples were determined for every 200 m or for each one of five coils of core material (200 data samples per one coil). According to the results, the average thickness differences of the five coils were 1 μm, 3 μm, 2 μm, 4 μm, and 2 μm, respectively, in order from the start of paste application.

Example 2

Figure 4:
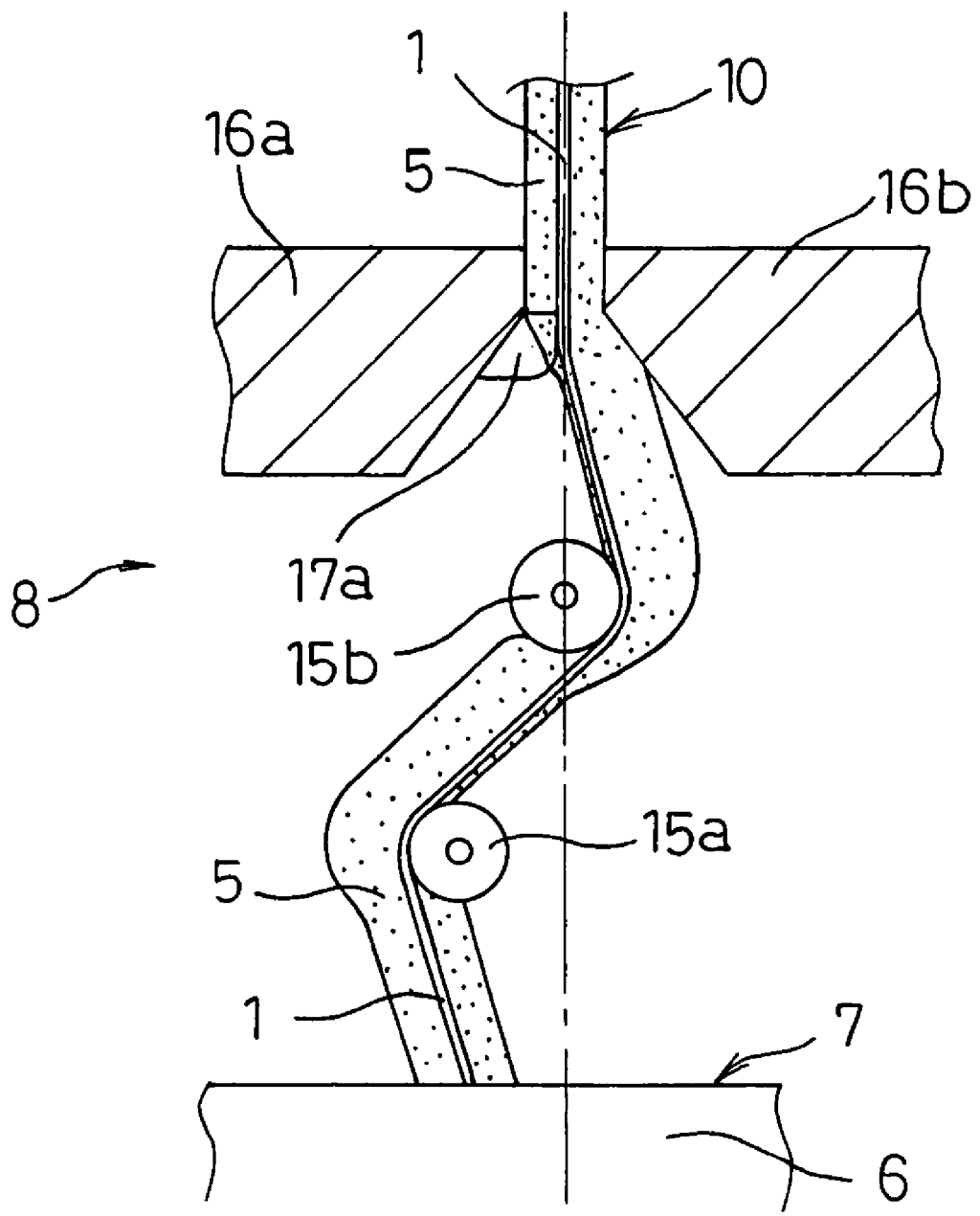
FIG. 4 is a side view illustrating the structure of the coating thickness adjusting unit in accordance with a second embodiment of the present invention.

The electrode mixture paste 5 was applied similarly to Example 1, the only difference from Example 1 being that the core material 1 and the press roller 15b were in contact with each other as shown in FIG. 4. Similarly to Example 1, the core material 1 did not once get stuck in between the scraper tools 16a and 16b during the paste application.

Samples were taken from the paste-coated sheet 10 similarly to Example 1, and the average differences in coating thickness between the front and back sides of these samples were determined for each coil of core material. According to the results, the average thickness differences of the five coils were 6 μm, 3 μm, 5 μm, 6 μm, and 4 μm, respectively, in order from the start of paste application.

Example 3

Figure 5:
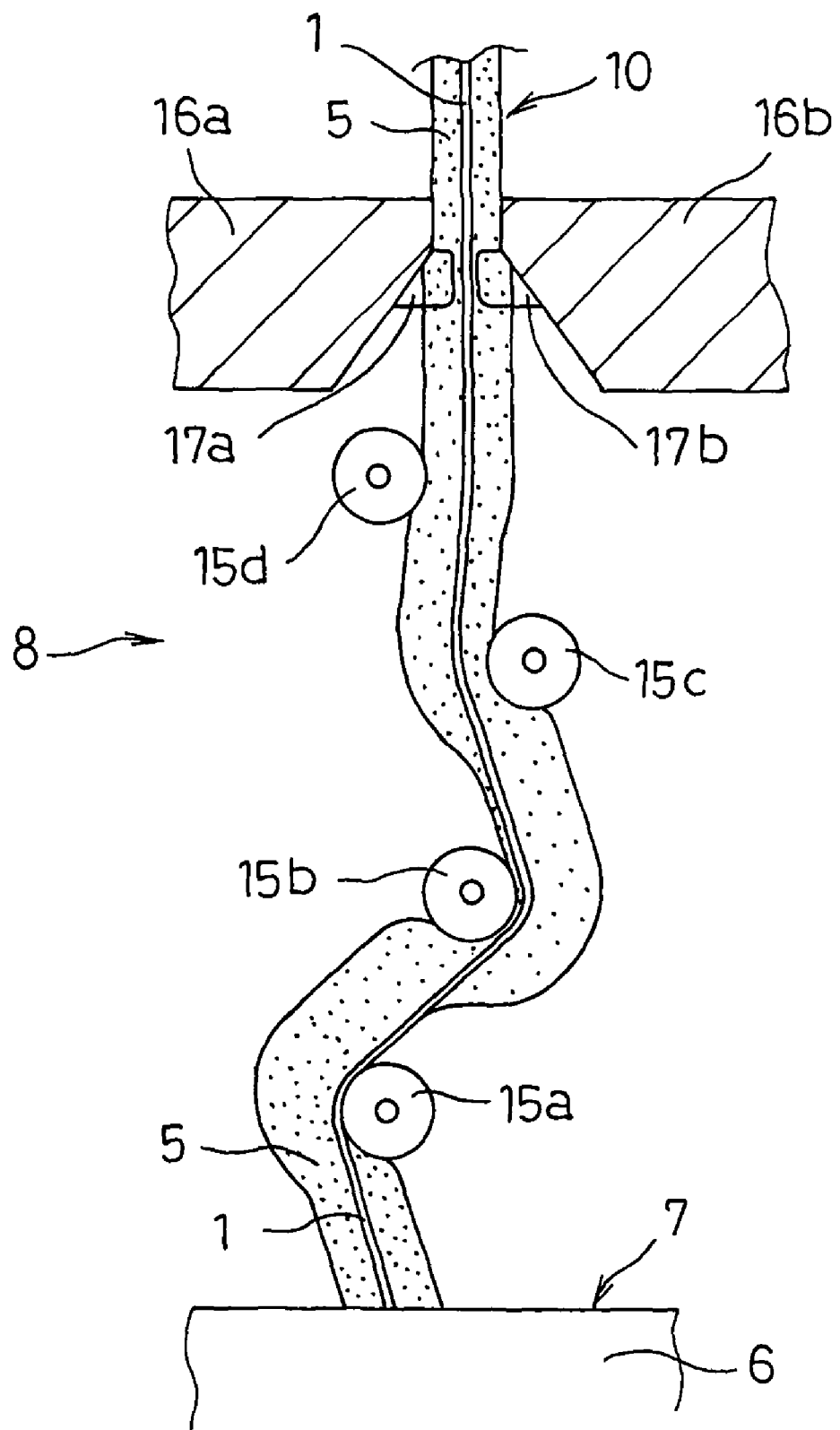
FIG. 5 is a side view illustrating the structure of the coating thickness adjusting unit in accordance with a third embodiment of the present invention.

The core material 1 and various units were arranged as shown in FIG. 5, with the protruding length of both projections 17a and 17b being 70 μm and the projections 17a and 17b being distanced from each other by 120 μm. With other conditions being the same, the electrode mixture paste 5 was applied similarly to Example 1. Similarly to Example 1, the core material 1 did not once get stuck in between the scraper tools 16a and 16b during the paste application.

Samples were taken from the paste-coated sheet 10 similarly to Example 1, and the average differences in coating thickness between the front and back sides of these samples were determined for each coil of core material. According to the results, the average thickness differences of the five coils were 15 μm, 20 μm, 18 μm, 13 μm, and 16 μm, respectively, in order from the start of paste application.

Comparative Example 1

Figure 6:
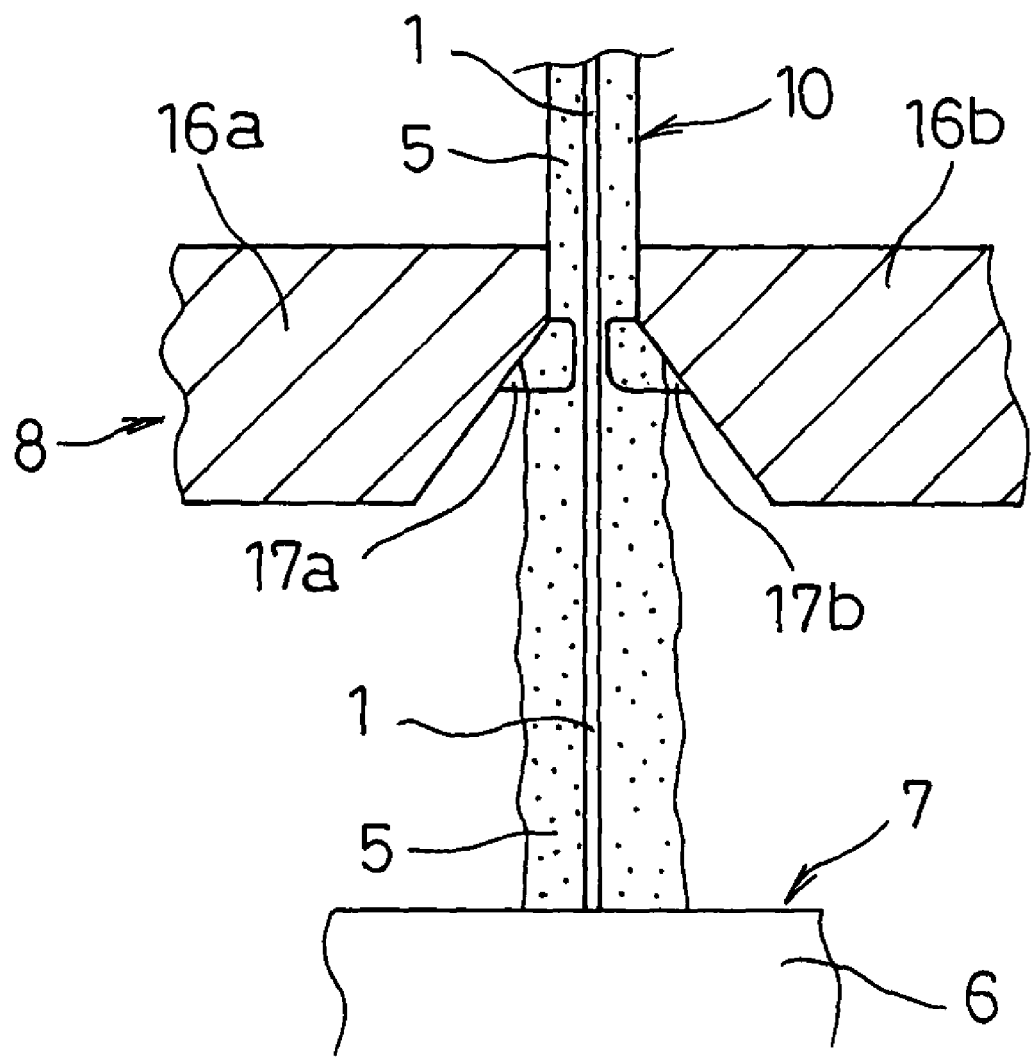
FIG. 6 is a side view illustrating the structure of one example of coating thickness adjusting unit given for comparison.

The press rollers 15a to 15d were removed from the arrangement of Example 3, and the core material 1 was fed as shown in FIG. 6. With other conditions being the same, the electrode mixture paste 5 was applied similarly to Example 1. Similarly to Example 1, the core material 1 did not once get stuck in between the scraper tools 16a and 16b during the paste application.

Samples were taken from the paste-coated sheet 10 similarly to Example 1, and the average differences in coating thickness between the front and back sides of these samples were determined for each coil of core material. According to the results, the average thickness differences of the five coils were 36 μm, 28 μm, 41 μm, 32 μm, and 45 μm, respectively, in order from the start of paste application.

Comparative Example 2

The electrode mixture paste 5 was applied similarly to Comparative Example 1, the only difference from Comparative Example 1 being that the projections 17a and 17b of the scraper tools 16a and 16b were distanced from each other by 65 μm. As the first weld point where the core materials are welded together passed between the scraper tools 16a and 16b, the core material 1 got stuck and so the paste application was stopped. Samples were taken from the paste-coated sheet 10 similarly to Example 1, and the average difference in coating thickness between the front and back sides was determined for the first coil of core material. According to the results, the average thickness difference was 2 μm.

As is clear from the above description, the application method of the present invention proved effective in reducing variation in coating thickness between the front and back sides of the core material as in Comparative Example 1, and in preventing failures resulting from weld points of the core material 1 as in Comparative Example 2. Examples 1 and 2, in particular, showed that feeding the core material 1 in contact with the projections 17a of only one scraper tool 16a improved the stability of the running core material 1, resulting in more precise control of coating thickness. Moreover, it was ascertained that more preferable results are achieved from the arrangement in which the press roller 15b nearest to the scraper tools 16a and 16b is offset from the centerline 18 of the gap between the scraper tools 16a and 16b along the running direction of the core material towards one scraper tool 16a provided with the projections 17a, as in Example 1, because the running core material 1 is reliably brought into contact with the projections 17a.

INDUSTRIAL APPLICABILITY

According to the method for applying electrode mixture paste of the present invention, the core material coated with the electrode mixture paste on both sides is pressed alternately from opposite sides to make the paste properties uniform, so that, even when the position-restricting ends of the scraper tools are distanced from each other by a length that is equal to or more than twice larger than the thickness of the core material, the position of the core material is precisely restricted when the core material is passed through the gap between the scraper tools to adjust the coating thickness of the paste. Therefore, not only the coating thickness is precisely regulated, but also, even in a continuous production process where core materials are connected together by welding, production failures due to weld points being stuck are prevented. This enables precise mass production of electrodes of rechargeable batteries for electric vehicle applications, where a large number of cells need to be connected in series, and thus the present invention is highly applicable to electrode production techniques of various batteries, and can be used in the production of electrodes of various batteries such as lithium ion batteries and nickel metal hydride batteries.

The invention claimed is:

1. A method for applying an electrode mixture paste, comprising:
    an application step of applying an electrode mixture paste (5) on both sides of a strip of core material (1) made of porous metal sheet having a weld point with a doubled thickness as the core material runs along a lengthwise direction thereof;
    a uniformizing step of pressing the core material coated with the electrode mixture paste alternately from opposite sides once or more; and
    a coating thickness adjusting step of adjusting a coating thickness of the electrode mixture paste by passing the core material coated with the electrode mixture paste through a gap between a pair of scraper tools (16a, 16b), a position of the core material being restricted using comb-shaped projections (17a, 17b) provided to at least one of the scraper tools, wherein
    the gap between the pair of scraper tools is wider than a thickness at the weld point of the core material.

2. The method for applying an electrode mixture paste according to claim 1, wherein the comb-shaped projection (17a) that is provided to one scraper tool (16a) is made contact with one surface of the core material (1) to restrict the position of the core material.

3. The method for applying an electrode mixture paste according to claim 2, wherein a press member (15b) that is nearest to the pair of scraper tools (16a, 16b) is offset from a centerline (18) of the gap between the pair of scraper tools along a running direction of the core material towards a side of one scraper tool that is provided with the comb-shaped projections.

* * * * *